US012572838B2

(12) United States Patent
Ahn

(10) Patent No.: US 12,572,838 B2
(45) Date of Patent: Mar. 10, 2026

(54) METHOD OF RECOVERING QUANTUM ERROR INDUCED BY NON-MARKOVIAN NOISE

(71) Applicant: University of Seoul Industry Cooperation Foundation, Seoul (KR)

(72) Inventor: Do Yeol Ahn, Seoul (KR)

(73) Assignee: UNIVERSITY OF SEOUL INDUSTRY COOPERATION FOUNDATION, Seoul (KR)

( * ) Notice: Subject to any disclaimer, the term of this patent is extended or adjusted under 35 U.S.C. 154(b) by 0 days.

(21) Appl. No.: 18/420,569

(22) Filed: Jan. 23, 2024

(65) Prior Publication Data

US 2025/0217690 A1     Jul. 3, 2025

(30) Foreign Application Priority Data

Dec. 27, 2023     (KR) ........................ 10-2023-0192376

(51) Int. Cl.
G06N 10/70     (2022.01)
G06N 10/20     (2022.01)

(52) U.S. Cl.
CPC ............. G06N 10/70 (2022.01); G06N 10/20 (2022.01)

(58) Field of Classification Search
CPC ................................ G06N 10/70; G06N 10/20
See application file for complete search history.

(56) References Cited

U.S. PATENT DOCUMENTS

| | | | | |
|---|---|---|---|---|
| 11,893,453 | B2 * | 2/2024 | Hsieh ...................... | G06F 30/30 |
| 2020/0293936 | A1 * | 9/2020 | Granade ................ | G06N 10/20 |
| 2021/0256409 | A1 * | 8/2021 | Biercuk ................. | G06F 15/82 |
| 2022/0067253 | A1 * | 3/2022 | Chen ...................... | G06N 10/00 |

FOREIGN PATENT DOCUMENTS

WO     WO-2023181019 A1 *     9/2023

OTHER PUBLICATIONS

Hideaki Hakoshima; Relationship between costs for quantum error mitigation and non-Markovian measures; published Jan. 29, 2021.*
Ahn, D., et al. "Non-Markovian noise sources for quantum error mitigation," Feb. 10, 2023, Quantum Physics, arXiv:2302.05053.
Ahn, D., "Non-Markovian cost function for quantum error mitigation with Dirac Gamma matrices representation," May 23, 2023, Quantum Physics, arXiv:2305.14464.
Ahn, D., "Non-Markovian cost function for quantum error mitigation with Dirac Gamma matrices representation," Sci Rep 13, 20069 (2023). https://doi.org/10.1038/s41598-023-45053-y.

* cited by examiner

*Primary Examiner* — Albert Decady
*Assistant Examiner* — Osman M Alshack
(74) *Attorney, Agent, or Firm* — KILE PARK REED & HOUTTEMAN PLLC

(57)     ABSTRACT
A method of recovering quantum error induced by non-markovian noise is disclosed. The method of recovering quantum error induced by non-markovian noise according to an exemplary embodiment of the present invention, includes obtaining a transfer function matrix including non-Markovian noise, obtaining an ideal operator for a requested gate operator, generating a recovery matrix by multiplying the ideal operator by an inverse matrix of a transfer function matrix including non-markovian noise, and multiplying the requested gate operator by a recovery matrix.

7 Claims, 6 Drawing Sheets

METHOD OF RECOVERING QUANTUM ERROR INDUCED BY NON-MARKOVIAN NOISE

CROSS REFERENCE TO RELATED APPLICATION

This application claims priority from and the benefit of Korean Patent Application No. 10-2023-0192376, filed on Dec. 27, 2023, which is hereby incorporated by reference for all purposes as if fully set forth herein.

BACKGROUND OF THE INVENTION

Field of the Invention

The present invention relates to a method of recovering quantum error.

DISCUSSION OF THE BACKGROUND

Investigating decoherence and gate errors as sources of noise is vital for understanding the underlying physical processes in quantum computing systems. These noise sources impose time and size constraints for practical applications. Despite these limitations, shallow quantum circuits hold potential significance for solving practical problems through hybrid quantum-classical algorithms. These hybrid systems can produce significant results that surpass classical computers, even with finite error rates, due to their error-resilience. To maximize error suppression or mitigation while minimizing the number of qubits, it is essential to consider the high cost of full-scale fault-tolerant quantum computing. Noise arises from interactions between the qubit system and its environment, making it crucial to comprehend the physical basis of these errors for effective error mitigation strategy implementation.

The current quantum error mitigation (QEM) scheme necessitates information on noise parameters, system size, and circuit depth. QEM methods often involve gate models to describe quantum circuits and time-dependent Hamiltonian dynamics, incorporating the Lindblad operator as a noise source. Descriptions of noise sources related to quantum state fluctuations can be derived from the kinetic perspective of non-equilibrium quantum statistical mechanics and are rooted in the quantum Liouville equation. In many cases, conventional Langevin-type descriptions of these fluctuations result in memoryless noise sources, known as Markovian events.

The primary focus in studying noise sources affecting Noisy Intermediate-Scale Quantum (NISQ) computers has been on Markovian noise. However, it is crucial to examine the relationship between QEM and non-Markovian noise sources, as these noise effects are practically unavoidable in most solid-state devices used for quantum computing. Markovian noise is characterized by memoryless behavior, while non-Markovian noise sources exhibit memory effects, where noise at any given moment depends on the system's past history. Non-Markovian noise is more complicated to model and presents more demanding error mitigation challenges. The non-Markovian equation involves Born approximation and is essentially a second order equation and has been derived and tried for decades in other field of physics.

SUMMARY OF THE INVENTION

In the present invention, a non-Markovian model of quantum state evolution and its quantum error recovery method for a NISQ device interacting with an environment featuring a simple harmonic oscillator as a noise source, and a QEM cost function for CNOT gate operation are provided.

A method of recovering quantum error induced by non-markovian noise according to an exemplary embodiment of the present invention, includes obtaining a transfer function matrix including non-Markovian noise, obtaining an ideal operator for a requested gate operator, generating a recovery matrix by multiplying the ideal operator by an inverse matrix of a transfer function matrix including non-markovian noise, and multiplying the requested gate operator by a recovery matrix.

For example, obtaining a transfer function matrix including non-Markovian noise, may be performed by using equations of motion for a total density operator obtained through the quantum Liouville equation through total Hamiltonian having two-state Hamiltonian, reservoir Hamiltonian, and interaction Hamiltonians between two-state and reservoir.

For example, the two-state Hamiltonian may be Hamiltonian expressed as stochastic Hamiltonian.

For example, the two-state Hamiltonian may be Hubbard Hamiltonian $H_S(t)=J(t) \vec{S}_1 \cdot \vec{S}_2$, where $J(t)$ is the time-dependent Heisenberg coupling for electron spin operators $\vec{S}_1, \vec{S}_2$.

For example, the quantum Liouville equation may be expressed as $\square$ $$\frac{d}{dt}\rho_T(t) = -i\left[\hat{H}_T(t) \cdot \rho_T(t)\right] = -i\hat{L}_T(t)\rho_T(t),$$

where $\hat{L}_T(t)=\hat{L}_S(t)+\hat{L}_B(t)+\hat{L}_{int}(t)$ is the Liouville super operator in one-to-one correspondence with the total Hamiltonian.

For example, the transfer function matrix $\rho(t)$ including non-markovian noise may be calculated by following equation, $$\rho(t) = \hat{V}^{(2)}(t)\rho(0) = \hat{U}_S(t)\rho(0) - \int_0^\tau ds \int_0^s d\tau d\tau \, tr_B\left[\hat{H}_{int}\hat{H}_{int}(\tau-s)\right.$$

$$\left.\rho_B\rho(-s)\right] + \int_0^\tau ds \int_0^s d\tau \, tr_B\left[\hat{H}_{int}(\tau-s)\rho_B\rho(-s)\rho_B\hat{H}_{int}\right] +$$

$$\int_0^\tau ds \int_0^s d\tau \, tr_B\left[\hat{H}_{int}\rho_B\rho(-s)\hat{H}_{int}(\tau-s)\right] -$$

$$\int_0^\tau ds \int_0^s d\tau \, tr_B\left[\rho_B\rho(-s)\hat{H}_{int}(\tau-s)\hat{H}_{int}\right].$$

For example, wherein the transfer function matrix may be formed by one of a single qubit gate, two qubits gate, tensor product thereof and tensor sums thereof.

According to a method of recovering quantum error, quantum error induced by non-markovian noise can be recovered.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

$$vs\ \frac{t}{\tau_s},$$

where $\tau_s$ is the switching time for the parameters $\Gamma_0\omega_c\tau_s$ in the range $7.0\times10^{-4}\leq\Gamma_0\omega_c\tau_s\leq7.0\times10^{-3}$.

Figure 4:
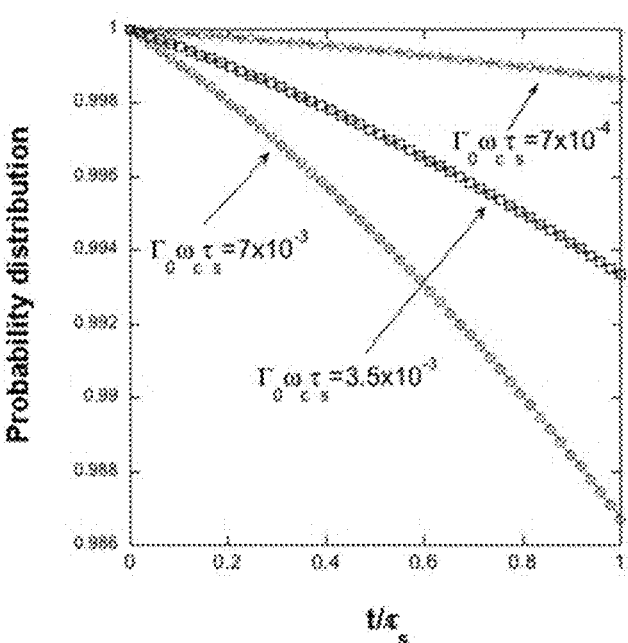

FIG. 4 is a plot of probability distribution for $\rho_{11}(t)$ given in Eq. (42)

$$vs\ \frac{t}{\tau_s},$$

where $\tau_s$ is the switching time for the parameters $\Gamma_0\omega_c\tau_s$ in the range $7.0\times10^{-4}\leq\Gamma_0\omega_c\tau_s\leq7.0\times10^{-3}$.

Figure 5:
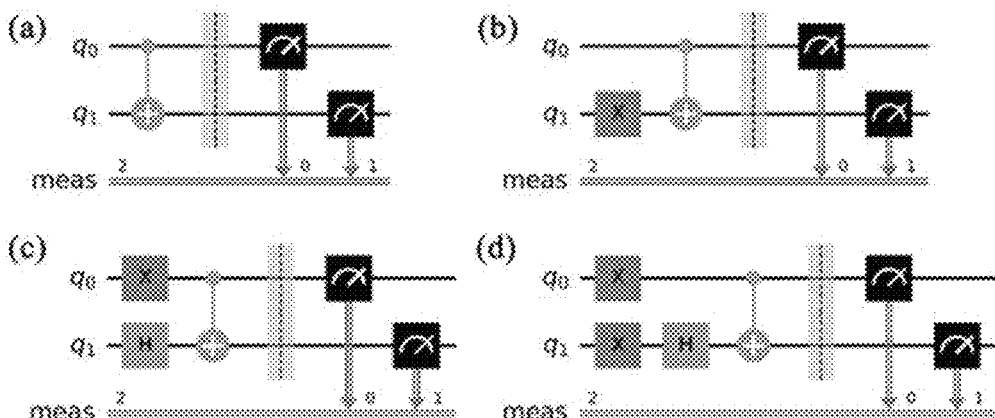

FIG. 5 is a schematic representation of the circuit for implementing a CNOT gate on the multiplet basis described in Eq. (34).

Figure 6:
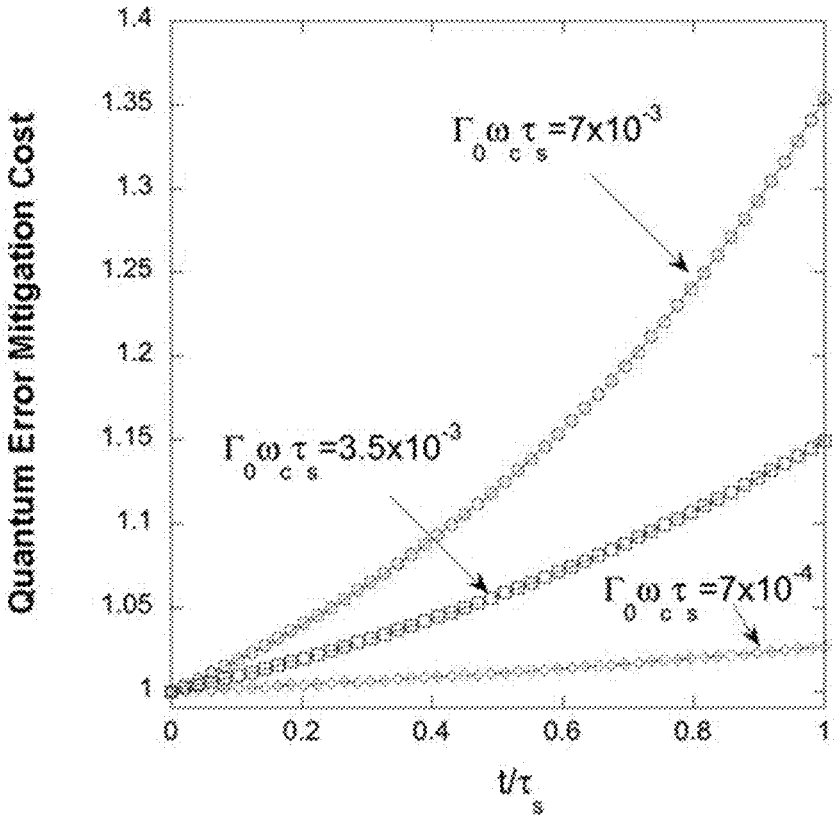

FIG. 6 is a graphical representation of the QEM cost function with respect to the normalized gate operation time $$\frac{t}{\tau_s}$$

for varying coupling strengths $\Gamma_0\omega_c\tau_s$ between a quantum system and its environment.

DETAILED DESCRIPTION OF THE ILLUSTRATED EMBODIMENTS

The present invention is described more fully hereinafter with reference to the accompanying drawings, in which example embodiments of the present invention are shown. The present invention may, however, be embodied in many different forms and should not be construed as limited to the example embodiments set forth herein. Rather, these example embodiments are provided so that this disclosure will be thorough and complete, and will fully convey the scope of the present invention to those skilled in the art. In the drawings, the sizes and relative sizes of layers and regions may be exaggerated for clarity.

It will be understood that, although the terms first, second, etc. may be used herein to describe various elements, these elements should not be limited by these terms. These terms are only used to distinguish one element from another element. For example, a first element discussed below could be termed a second element, and similarly, a second element may also be termed a first element, without departing from the teachings of the present invention.

The terminology used herein is for the purpose of describing particular example embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, components, and/or groups thereof but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs.

It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present invention will be described in detail with reference to the accompanying drawings.

A method of recovering quantum error induced by non-markovian noise according to an exemplary embodiment of the present invention, includes obtaining a transfer function matrix including non-Markovian noise, obtaining an ideal operator for a requested gate operator, generating a recovery matrix by multiplying the ideal operator by an inverse matrix of a transfer function matrix including non-markovian noise, and multiplying the requested gate operator by a recovery matrix.

For example, obtaining a transfer function matrix including non-Markovian noise, may be performed by using equations of motion for a total density operator obtained through the quantum Liouville equation through total Hamiltonian having two-state Hamiltonian, reservoir Hamiltonian, and interaction Hamiltonians between two-state and reservoir.

For example, the two-state Hamiltonian may be Hamiltonian expressed as stochastic Hamiltonian.

For example, the two-state Hamiltonian may be Hubbard Hamiltonian $H_S(t)=J(t)\ \vec{S}_1\cdot\vec{S}_2$, where $J(t)$ is the time-dependent Heisenberg coupling for electron spin operators $\vec{S}_1,\ \vec{S}_2$.

For example, the quantum Liouville equation may be expressed as $$\frac{d}{dt}\rho_T(t) = -i\left[\hat{H}_T(t),\ \rho_T(t)\right] = -i\hat{L}_T(t)\rho_T(t),$$

where $\hat{L}_T(t)=\hat{L}_S(t)+\hat{L}_B(t)+\hat{L}_{int}(t)$ is the Liouville super operator in one-to-one correspondence with the total Hamiltonian.

For example, the transfer function matrix $\rho(t)$ including non-markovian noise may be calculated by following equation, $$\begin{aligned}
\rho(t) &= \hat{V}^{(2)}(t)p(0) \\
&= \hat{U}_S(t)\rho(0) - \int_0^t ds \int_0^s d\tau\, d\tau\, tr_B\left[\hat{H}_{int}\hat{H}_{int}(\tau-s)\rho_B\rho(-s)\right] + \\
&\quad \int_0^t ds \int_0^s d\tau\, tr_B\left[\hat{H}_{int}(\tau-s)\rho_B\rho(-s)\rho_B\hat{H}_{int}\right] + \\
&\quad \int_0^t ds \int_0^s d\tau\, tr_B\left[\hat{H}_{int}\rho_B\rho(-s)\hat{H}_{int}(\tau-s)\right] - \\
&\quad \int_0^t ds \int_0^s d\tau\, tr_B\left[\rho_B\rho(-s)\hat{H}_{int}(\tau-s)\hat{H}_{int}\right].
\end{aligned}$$

For example, wherein the transfer function matrix may be formed by one of a single qubit gate, two qubits gate, tensor product thereof and tensor sums thereof.

Hereinafter, the present invention will be described in detail.

In the present invention, we present a non-Markovian approach to analyze quantum state fluctuations in near-term quantum computing devices, aiming to determine the QEM cost function. This approach is relevant as non-Markovian noise effects are common in these devices, and understanding their impact is essential for developing effective error mitigation strategies.

Employing the non-Markovian approach and modeling the environment with simple harmonic oscillators allows us to investigate the relationship between noise sources and the quantum system's performance. This understanding is crucial for determining the QEM cost function, which quantifies the effectiveness of error reduction techniques applied to a quantum computing system.

The insights gained from this non-Markovian approach can inform tailored QEM strategies for near-term quantum computing devices. Addressing the unique challenges posed by non-Markovian noise sources enables researchers to design more robust and efficient error mitigation techniques, leading to improved performance and reliability of these devices in the presence of various environmental disturbances.

Dissipation in quantum dynamics of a two-state or qubit system is widely encountered in physics and chemistry, and its description remains a significant theoretical challenge, especially when considering non-Markovian processes. These non-Markovian processes related to dissipation are closely linked to the low-frequency noise spectrum. It has been suggested that low-frequency noise plays a crucial role in decoherence processes in ion trap or superconducting systems for near-term quantum computers. Understanding non-Markovian quantum dynamics of a two-state system is also important for evaluating the performance of an adiabatic quantum computer in the presence of noise. This is because, for many difficult problems, the computation bottleneck involves passing through a point where the gap between the ground state and the first excited state is small, and the system is strongly coupled to the environment. One of the authors previously developed a time-convolutionless reduced-density operator theory of noisy quantum-state evolution. This time-convolutionless formulation was shown to incorporate both non-Markovian relaxation and memory effects. The time-convolutionless equations of motion were initially suggested by Tokuyama and Mori in the Heisenberg picture, and later developed in the Schrödinger picture using the projection operator technique. In this work, we extend the reduced-density operator theory to derive an expression for the quantum Liouville equation for a two-state system, making it more suitable for perturbational analysis to obtain the master equation in the presence of low-frequency noise and strong coupling to the environment.

This extended approach enables a comprehensive exploration of non-Markovian noise impacts on quantum computing device performance. By analyzing various noise sources' influence on system dynamics, researchers can pinpoint major error contributors and devise error mitigation strategies. Moreover, understanding non-Markovian noise characteristics facilitates tailored error correction techniques addressing these sources' unique challenges. Studying non-Markovian noise sources and their QEM relationship is crucial for quantum computing technology advancement. Utilizing a non-Markovian approach to assess quantum state fluctuations and addressing the distinct challenges of these noise sources allows for more effective QEM strategies, enhancing near-term quantum computing device performance and reliability. This work ultimately contributes to harnessing quantum computing power for numerous practical applications, including cryptography and materials science.

Theoretical Formulation

Figure 1:
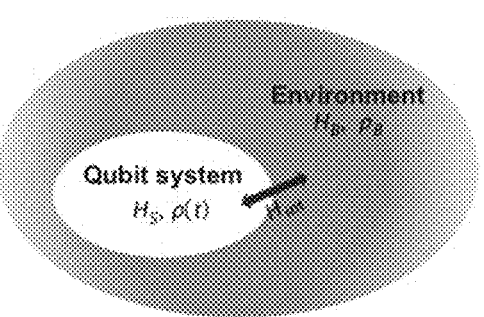
FIG. 1 is schematic representation of the open quantum system consisting of a two-state quantum subsystem $H_S$, an environment $H_B$, and their mutual interaction $H_{int}$.

The total Hamiltonian for an open two-state system is given by $$\hat{H}_T = \hat{H}_s(t) + \hat{H}_B + \hat{H}_{int} \qquad (1a)$$

where $\hat{H}_S(t)$ is the system Hamiltonian for a two-state system, $\hat{H}_B$ the Hamiltonian acting on the reservoir or an environment, $\hat{H}_{int}$ is the interaction between the system and the environment (as depicted in FIG. 1). We model the system by the Hubbard Hamiltonian $$H_S(t) = J(t)\vec{S}_1 \cdot \vec{S}_2 \qquad (1b)$$

where $J(t)$ is the time-dependent Heisenberg coupling for electron spin operators $\vec{S}_1$, $\vec{S}_2$. The equation of motion for the total density operator $\rho_T(t)$ of the total system is given by a quantum Liouville equation $$\Box \frac{d}{dt}\rho_T(t) = -i[\hat{H}_T(t), \rho_T(t)] = -i\hat{L}_T(t)\rho_T(t), \qquad (2)$$

where $$\hat{L}_T(t) = \hat{L}_S(t) + \hat{L}_B(t) + \hat{L}_{int}(t) \qquad (3)$$

is the Liouville super operator in one-to-one correspondence with the Hamiltonian. Here, we use the unit in which $\hbar=1$. In order to derive an equation and to solve for a system alone, it is convenient to use the projection operators which decompose the total system by eliminating the degrees of freedom for the reservoir. We define thine-independent projection operator $\underline{P}$ and $\underline{Q}$ given by $$\underline{P}X = \rho_B tr_B X, \quad \underline{Q} = 1 - \underline{P} \qquad (4)$$

for any dynamical variable X. Here $tr_B$ denotes a partial trace over the quantum reservoir and $\rho_B$ is the density matrix of the reservoir. The projection operators satisfy the following operator identities:

$$\underline{P}^2 = \underline{P}, \underline{Q}^2 = \underline{Q}\underline{P}\underline{Q} = \underline{Q}\underline{P} = 0, \qquad (5a)$$

$$\underline{P}\hat{L}_S(t) = \hat{L}_S(t)\underline{P}, \underline{P}\hat{L}_B = \hat{L}_B\underline{P} = 0, \underline{P}\hat{L}_{int}\underline{P} = 0, \qquad (5b)$$

$$\text{and } \underline{Q}\hat{L}_S = \hat{L}_S(t)\underline{Q}, \underline{Q}\hat{L}_B = \hat{L}_B\underline{Q} = \hat{L}_B. \qquad (5c)$$

The information of the system is then contained in the reduced density operator $$\rho(t) = tr_B\rho_T(t) = tr_B\underline{P}\rho_T(t). \qquad (6)$$

If we multiply equation (2) by $\underline{P}$ and $\underline{Q}$ on the left side, we obtain coupled equations for $\underline{P}\rho_T(t)$ and $\underline{Q}\rho_T(t)$ as follows:

$$\frac{d}{dt}\underline{P}\rho_T(t) = -i\underline{P}\hat{L}_T(t)\underline{P}\rho_T(t) - - i\underline{P}\hat{L}_T(t)\underline{Q}\rho_T(t), \qquad (7a)$$

and $$\frac{d}{dt}\underline{Q}\rho_T(t) = -i\underline{Q}\hat{L}_T(t)\underline{Q}\rho_T(t) - - i\underline{Q}\hat{L}_T(t)\underline{P}\rho_T(t), \qquad (7b)$$

where we have modified the Eq. (2) as $$\frac{d}{dt}\rho_T(t) = -i\hat{L}_T(t)\rho_T(t) = - - i\hat{L}_T(t)(\underline{P}+\underline{Q})\rho_T(t).$$

We assume that the system was turned on at t=0 and the input state prepared at t=0 was isolated with the reservoir such that $\underline{Q}\rho_T(0)=0$.

The formal solution of Eq. (2) is given by (Supplementary Information)

$$\rho_B\rho(t) = \rho_B\hat{U}_S(t,0)\rho(0) - \qquad (9)$$
$$i\rho_B\int_0^t ds\hat{U}_S(t,s)tr_B[\hat{L}_T(s)\{\hat{\theta}(s)-1\}\rho_B]tr_B[\underline{G}(t,s)\hat{\theta}(t)\rho_B]\rho(t),$$

or $$\left(1 + i\int_0^t ds\hat{U}_S(t,s)tr_B[\hat{L}_T(s)\{\hat{\theta}(s)-1\}\rho_B]tr_B[\underline{G}(t,s)\hat{\theta}(t)\rho_B]\right)\rho(t) = \qquad (10)$$
$$\hat{U}_S(t,s)\rho(t).$$

Here $\hat{U}_S(t,s)$ is the propagator of the system defined by $$\hat{U}(t,s)\underline{P} = \underline{T}\exp\left[-i\int_s^t d\tau\underline{P}\hat{L}_T(\tau)\underline{P}\right]\underline{P} \qquad (11)$$
$$= \underline{T}\exp\left[-i\int_s^t d\tau\hat{L}_S(\tau)\underline{P}\right]\underline{P}$$
$$= \underline{T}\exp\left[-i\int_s^t d\tau\hat{L}_S(\tau)\right]\underline{P} = \hat{U}_S(t,s)\underline{P}.$$

In Equations (9) and (10), we introduce a super operator $\hat{\theta}(t)$ which are given by $$\hat{\theta}^{-1}(t) = 1 + i\int_0^t d\tau\underline{H}(t,\tau)\underline{Q}\hat{L}_T(\tau)\underline{P}\,\underline{G}(t,\tau),$$

where the projected propagator $\underline{H}(t,\tau)$ of the total system is defined by $$\underline{H}(t,\tau) = \underline{T}\exp\left[-i\int_\tau^t \underline{Q}\hat{L}_T(s)\underline{Q}ds\right].$$

Here $\underline{T}$ is the time-ordering operator. We also introduce an anti-time evolution operator $\underline{G}(t,\tau)$ which is defined by $$\underline{G}(t,\tau) = \underline{T}^C\exp\left[i\int_\tau^t \hat{L}_T(s)ds\right].$$

If we define $\hat{W}(t)$ by $$\hat{W}(t) = 1 + i\int_0^t ds\hat{U}_S(t,s)tr_B[\hat{L}_T(s)\{\hat{\theta}(s)-1\}\rho_B]tr_B[\underline{G}(t,s)\hat{\theta}(t)\rho_B], \qquad (12)$$

Then, the evolution operator for the reduced density operator $\rho(t)$ is given by $$\rho(t) = \hat{W}^{-1}(t)\hat{U}_S(t,0)\rho(0) = \hat{V}(t)\rho(0), \qquad (13)$$

where the super-operator $\hat{V}(t)$ for the evolution of the reduced density operator is defined by $\hat{V}(t)=\hat{W}^{-1}(t)\hat{U}_S(t,0)$. Within the Born approximation, we have (Supplementary Information)

$$\hat{V}^{(2)}(t) = \left\{1 - \int_0^t ds\int_0^s d\tau\hat{U}_S(t,s) \qquad (14)\right.$$
$$\left. tr_B\left[\hat{L}_{int}\hat{U}_o(s,\tau)\hat{L}_{int}\hat{U}_o^{-1}(s,\tau)\rho_B\right]\hat{U}_o^{-1}(t,s)\right\}\hat{U}_S(t,0),$$

where $$\hat{U}_o(t) = \underline{T}\exp\left[-i\int_0^t d\tau(\hat{L}_S(\tau)+\hat{L}_B)\right] \qquad (15)$$
$$= \exp(-it\hat{L}_B)\underline{T}\exp\left[-i\int_0^t d\tau(\hat{L}_S(\tau))\right]$$
$$= \hat{U}_B(t)\hat{U}_S(t).$$

After some mathematical manipulations, $\hat{V}^{(2)}(t)\,\rho(0)$ becomes $$\rho(t) = \qquad (16)$$
$$\hat{V}^{(2)}(t)\rho(0) = \hat{U}_S(t)\rho(0) - \int_0^t ds\int_0^s d\tau d\tau tr_B[\hat{H}_{int}\hat{H}_{int}(\tau-s)\rho_B\rho(-s)] +$$
$$\int_0^t ds\int_0^s d\tau tr_B[\hat{H}_{int}(\tau-s)\rho_B\rho(-s)\rho_B\hat{H}_{int}] +$$
$$\int_0^t ds\int_0^s d\tau tr_B[\hat{H}_{int}\rho_B\rho(-s)\hat{H}_{int}(\tau-s)] -$$
$$\int_0^t ds\int_0^s d\tau tr_B[\rho_B\rho(-s)\hat{H}_{int}(\tau-s)\hat{H}_{int}].$$

Here $\hat{H}_{int}(\tau-s)$ and $\rho(-s)$ are Heisenberg operators defined by $$\hat{H}_{int}(\tau-s) = \exp(i\hat{H}_o(\tau-s))\hat{H}_{int}\exp(-i\hat{H}_o(\tau-s)),$$
$$\rho(-s) = \exp\left(-i\int_0^s dt\hat{H}_S(t)\right)\rho(0)\exp\left(i\int_o^s dt\hat{H}_S(t)\right),$$

respectively.

Results

In this work, we focus on the two-qubit gate operations and model the interaction of the quantum system with the environment during the gate operation by a Caldeira-Leggett model where a set of harmonic oscillators are coupled linearly with the system spin by $$\hat{H}_{int} = \lambda \sum_{i=1,2, j=1,2,3} \vec{S}_i \cdot \vec{b}_i, \quad S_i^j = \frac{\hbar}{2}\sigma_i^j \tag{17}$$

where $\sigma_i^j$ are the Pauli matrices $\sigma_i^1 = X_i$, $\sigma_i^2 = Y_i$, $\sigma_i^3 = Z_i$ and $b_i^j$ is the fluctuating quantum field associated the ith qubit, whose motion is governed by the harmonic-oscillator Hamiltonian.

In the evaluation of Eq. (16), we obtain the following relations:

$$tr_B\{b_k^l(t)b_i^j\rho_B\} = \delta_{ik}\delta_{ji}[\Gamma(t) + i\Delta(t)], \tag{18}$$

$$tr_B\{b_i^j b_k^l(t)\rho_B\} = \delta_{ik}\delta_{ji}[\Gamma(t) - i\Delta(t)],$$

where $$\Gamma(t) + i\Delta(t) = \frac{\lambda^2}{\pi}\int_0^\infty J(\omega)\left\{\exp(-i\omega t) + \coth\left(\frac{\omega}{2k_BT}\right)\cos\omega t\right\}. \tag{19}$$

Here $J(\omega)$ is the ohmic damping given by $J(\omega) = \theta(\omega_c - \omega)\eta\omega$, $\Gamma$ is the decoherence rate of the qubit system.

We evaluate the reduced-density-operator in the multiplet basis representation $$\rho(t) = \sum_{a,b}\rho_{ab}(t)e_{ab}, \quad e_{ab} = |a\rangle\langle b|, \quad a, b = 1,2,3,4, \tag{20}$$

where $e_{ab}$ is the multiplet states. The inner product between the multiplet basis is defined by $$(e_{ab}, e_{cd}) = tr[e_{ab}^\dagger e_{cd}] = \delta_{ac}\delta_{bd}. \tag{21}$$

Then, from Eqs. (16)-(21), we obtain the matrix component of the reduced-density-operator as (Supplementary Information)

$$\rho_{ab}(t) = V_{ab|cd}(t)\rho(0), \tag{22}$$

$$V_{ab|cd}(t) = \exp[-it(E_a - E_b)]$$

$$\left\{\delta_{ac}\delta_{bd} - \left[\delta_{bd}\sum_{a'}M_{aa'a'c} - M_{acdb}\right]k(t) - \left[\delta_{ac}\sum_{a'}M_{aa'a'b} - M_{acdb}\right]k^*(t)\right\}$$

where $$M_{abcd} = \sum_{i,j}\langle a1S_i^j|b\rangle\langle c1S_i^j|d\rangle \tag{23}$$

$$= \frac{1}{4}\sum_{i=1,2}\{\langle a|X_i|b\rangle\langle c|X_i|d\rangle + \langle a|Y_i|b\rangle\langle c|Y_i|d\rangle +$$

$$\langle a|Z_i|b\rangle\langle c|Z_i|d\rangle\}, \quad \text{and}$$

$$k(t) = \tag{24}$$

$$\frac{2}{\pi}\Gamma_o\left\{\frac{\pi}{2}\omega_c t + \int_0^{\frac{t}{\tau_s}} Si(\omega_c\tau_s t)dt\right\} + i\Delta_o\left\{\frac{t}{\tau_s} - \frac{1}{\omega_c\tau_s}\left(\frac{\pi}{2}\omega_c\tau_s + Si(\omega_c t)\right)\right\}.$$

Here $\omega_c$ is the high frequency cutoff, $\tau_s$ is the gate switching time, $\Gamma_0 = \lambda^2\eta k_BT\tau_s$ and $$\Delta_o = \frac{\lambda^2\eta\omega_c\tau_s}{\pi}.$$

We now study the non-Markovian errors associated with two-qubit gate operations. In Eq. (24), $$Si(x) = \int_0^x dt\frac{\sin t}{t},$$

is a sine integral.

In Eq. (22), $V_{ab|cd}(t)$ is the quantum evolution operator for the reduced density operator containing the effects of non-Markovian noise sources. The purpose of QEM is to restore the ideal quantum evolution without noisy processes. If we denote the ideal quantum volution and QEM based recovery operation as $\varepsilon_I(t)$ and $R_{QEM}(t)$, respectively, such that $$\varepsilon_{Iab|cd}(t) = \sum_{e,f}R_{QEM\,ab|ef}(t)V_{ef|cd}(t), \tag{25}$$

$$\text{and } R_{QEM}(i) = \sum_i\mu_iO_i = c(t)\sum_i\text{sgn}(\mu_i)p_iO_i. \tag{26}$$

Here, $$c(t) = \sum_i|\mu_i|$$

is the QEM cost function, $$p_i = \frac{|\mu_i|}{c(t)},$$

and $\{O_i\}$ is the set of physical operations applied for QEM. We first consider the identity operation depicted in FIG. 2. For identity operation, the multiple basis is given by $$|1\rangle^m = |00\rangle, \tag{27}$$

$$|2\rangle^m = \frac{1}{\sqrt{2}}(|01\rangle + |10\rangle),$$

$$|3\rangle^m = |11\rangle,$$

$$|4\rangle^m = \frac{1}{\sqrt{2}}(|01\rangle - |10\rangle)$$

Assuming that the initial state is given by $\rho_{cd}(0)=|00\rangle\langle00|=\rho^m_{11}(0)$, we obtain $$\rho^m_{11}(t) = V_{1111}(t)\rho^m_{11}(0) \tag{28}$$
$$= \left\{1 - 2\left[\sum_{a'}M_{1a'a'1} - M_{1111}\right]Re\,k(t)\right\}\rho^m_{11}(0),$$
$$= (1 - 2Re\,k(t))\rho^m_{11}(0)$$

$$\rho^m_{22}(t) = V_{2211}(t)\rho^m_{11}(0)$$
$$= 2M_{2112}Re\,k(t)\rho^m_{11}(0),$$
$$= Re\,k(t)\rho^m_{11}(0)$$

$$\rho^m_{33} = V_{3311}(t)\rho^m_{11}(0)$$
$$= 2M_{3113}Re\,k(t)\rho^m_{11}(0),$$
$$= 0$$

$$\rho^m_{44}(t) = V_{4411}(t)\rho^m_{11}(0)$$
$$= 2M_{4114}Re\,k(t)\rho^m_{11}(0).$$
$$= Re\,k(t)\rho^m_{11}(0)$$

In NISQ machines, the input and out states are represented by the computational basis:

$$e^c_{\alpha\beta} = |\alpha\rangle\langle\beta|,\ \alpha,\ \beta = 1,2,3,4,\ \{|00\rangle, |01\rangle, |10\rangle, |11\rangle\}. \tag{29}$$

Then the reduce-density-operator in the computational basis is given by $$\rho^c_{\alpha\beta}(t) = \sum_{a',b'}C_{\alpha\beta|a'b'}\rho^m_{a'b'}(t), \tag{30}$$

$$C_{\alpha\beta|ab} = tr\left(e^{c\dagger}_{\alpha\beta}, e^m_{ab}\right).$$

By substituting, Eqs. (29). (30) into Eq. (28), we obtain '

$$\rho^c_{11}(t) = (1 - 2Re\,k(t))\rho^m_{11}(0), \tag{31}$$
$$\rho^c_{22}(t) = Re\,k(t)\rho^m_{11}(0),$$
$$\rho^c_{33}(t) = Re\,k(t)\rho^m_{11}(0)$$
$$\rho^c_{44}(t) = 0.$$

Here $1-2Re\,k(t)$, $Re\,k(t)$, $Re\,k(t)$, 0 are the probabilities of finding the output states of the system in $|00\rangle$, $|01\rangle$, $|10\rangle$, $|11\rangle$ states at time t, respectively.

Figure 3:
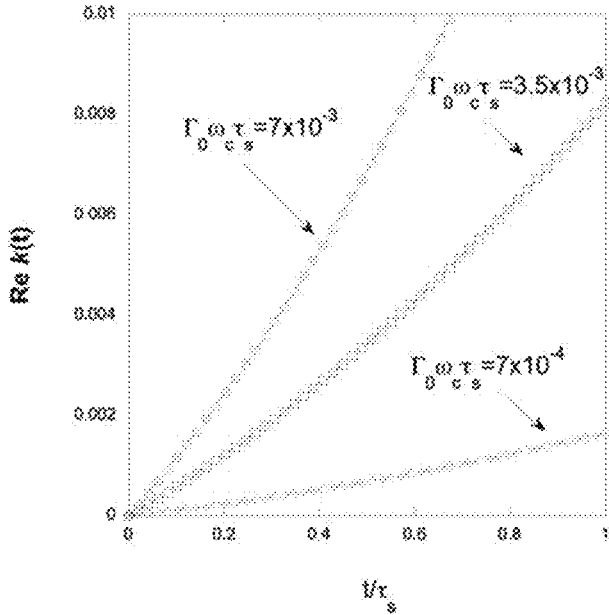
FIG. 3 is a plot of Re k(t)

In FIG. 3, we show the plot of $Re\,k(t)$ $$vs\frac{t}{\tau_s},$$

where $\tau_s$ is the switching time for the parameters $\Gamma_0\omega_c\tau_s$ in the range $7.0\times10^{-4}\leq\Gamma_0\omega_c\tau_s\leq7.0\times10^{-3}$.

To estimate the quantum state fluctuation in practical NISQ devices, two platforms were employed: ibm_guadalupe through IBM Quantum and IonQ through Amazon Braket. The probabilities of each state after 1,000 iterations are presented in Table 1.

TABLE 1

| Quantum state fluctuations under the identity operation | | | | |
|---|---|---|---|---|
| Initial state: $|00\rangle$ | $|00\rangle$ | $|01\rangle$ | $|10\rangle$ | $|11\rangle$ |
| Ibm_guadalupe | 0.987 | 0.006 | 0.007 | 0 |
| IonQ | 0.998 | 0.001 | 0.001 | 0 |
| Theory: | $1 - 2Re\,k(t)$ | $Re\,k(t)$ | $Re\,k(t)$ | 0 |
| probability for | | [1] $Re\,k(\tau_s^{IBM}) = 6\times10^{-3}$ | | |
| each iteration at | | [2] $Re\,k(\tau_s^{IonQ}) = 1\times10^{-3}$ | | |
| time t | | | | |

From the above table, the decoherence function $Re\,k(t)$ at switching time $\tau_s$ can be estimated for each NISQ machine as, $Re\,k(\tau^{IBM}_s)=6\times10^{-3}$, and $Re\,k(\tau^{IonQ}_s)=1\times10^{-3}$, respectively. It is interesting to note that the $Re\,k(t)$ can be approximated as (Appendix A)

$$Re\,k(t) \approx \frac{2}{\pi}\Gamma_0\omega_c\tau_s\left\{\frac{\pi}{2}\left(\frac{t}{\tau_s}\right) + \frac{1}{2}\left(\frac{t}{\tau_s}\right)^2\right\}. \tag{32}$$

Figure 2:
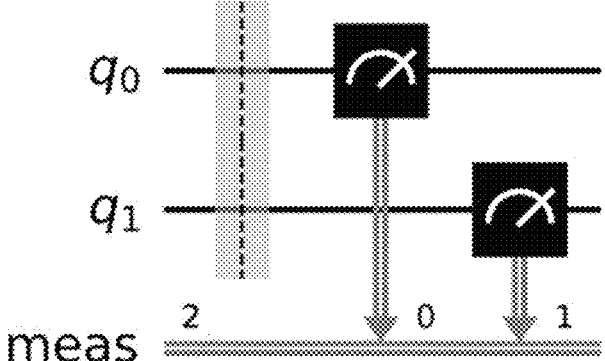
FIG. 2 is schematic representation of the identity operation circuit.

The change of $$Re\,k(t)\ vs\frac{t}{\tau_s}$$

for various $\Gamma_0\omega_c\tau_s$ is shown in FIG. 2. This figure shows that $Re\,k(t)$ increases almost quadratic for $$\frac{t}{\tau_s}.$$

Then, from Eqs. (31) and (32), we obtain (Appendix B)

$$\rho^c_{11}(t) \approx \left(1 - \frac{4}{\pi}\Gamma_0\omega_c\tau_s\left[\frac{t}{\tau_x} + \frac{1}{2}\left(\frac{t}{\tau_s}\right)^2\right]\right)\rho^m_{11}(0) \tag{33}$$
$$= \exp\left[\frac{2}{\pi}\Gamma_0\omega_c\tau_x\right]\exp\left[-\frac{2}{\pi}\Gamma_0\omega_c\tau_s\left(\frac{t}{\tau_s} + \frac{\pi}{2}\right)^2\right]\rho^m_{11}(0).$$

with the evolution process is governed by Gaussian in time and the peak value of the density matrix element occurs at t=0 is unity as depicted in FIG. 4. The NISQ system parameter $\Gamma_0\omega_c\tau_s$ is $2.548\times10^{-3}$ for ibm-guadrupe and $4.26\times10^{-4}$ for IonQ, respectively. Our non-Markovian model allows bit-flip as a noise source as can be seen by the results of Equation (31) and Table 1.

We now consider the non-Markovian error associated with CNOT gate operation depicted in FIG. 5. For CNOT gate operation, the multiplet basis is given by $$|1\rangle > CNOT = |00\rangle, \tag{34}$$
$$|2\rangle > CNOT = |01\rangle,$$
$$|3\rangle > CNOT = \frac{1}{\sqrt{2}}(|10\rangle > |11\rangle >),$$
$$|4\rangle > CNOT = \frac{1}{\sqrt{2}}(|10\rangle > -|11\rangle >).$$

Corresponding experimental results as compared with the numerical results for the CNOT gate are given as Table 1(a) to Table 1(d) in the Supplementary Information.

The noisy evolution operator V(t) represented by the multiplet basis of Eq. (35) is given by $$V(t) = \begin{bmatrix} 1 - 2Re\,k(t) & Re\,k(t) & \dfrac{Re\,k(t)}{2} & \dfrac{Re\,k(t)}{2} \\ Re\,k(t) & 1 - 2\,Re\,k(t) & \dfrac{Re\,k(t)}{2} & \dfrac{Re\,k(t)}{2} \\ \dfrac{Re\,k(t)}{2} & \dfrac{Re\,k(t)}{2} & 1 - \dfrac{3Re\,k(t)}{2} & \dfrac{Re\,k(t)}{2} \\ \dfrac{Re\,k(t)}{2} & \dfrac{Re\,k(t)}{2} & \dfrac{Re\,k(t)}{2} & 1 - \dfrac{3Re\,k(t)}{2} \end{bmatrix}, \tag{35}$$

from Eqs. (67), (69), (71) and (73) of the Supplementary Information.

Then the QEM recovery operator $R_{QEM}(t)$ is obtained from Eqs. (25) and (35) and is given by $$R_{QEM}(t) = \begin{bmatrix} C & D & B & B \\ D & C & B & B \\ B & B & E & F \\ B & B & F & E \end{bmatrix}, \tag{36}$$

-continued where $$B = \frac{-0.5a + 2.125\alpha^2 - 1.8785\alpha^3}{1 - 5.5\alpha + 8.3125\alpha^2 - 1.5\alpha^3 - 2.8125\alpha^4}, \tag{37}$$

$$C = \frac{1 - 3.5\alpha + 2.8125\alpha^2}{1 - 5.5\alpha + 8.3125\alpha^2 - 1.5\alpha^3 - 2.8125\alpha^4},$$

$$D = \frac{-\alpha + 2\alpha^2 - 0.9375\alpha^3}{1 - 5.5\alpha + 8.3125\alpha^2 - 1.5\alpha^3 - 2.8125\alpha^4},$$

$$E = \frac{1 - 4.75\alpha + 5.5\alpha^2 - 0.75\alpha^3}{1 - 5.5\alpha + 8.3125\alpha^2 - 1.5\alpha^3 - 2.8125\alpha^4},$$

$$F = \frac{-0.5\alpha + 2.5\alpha^2 - 3\alpha^3}{1 - 5.5\alpha + 8.3125\alpha^2 - 1.5\alpha^3 - 2.8125\alpha^4}$$

and $\alpha = Re\,k(t)$.

The QEM recovery operator can be expanded by 16 Dirac matrices $E_{ij} = (\sigma_i \otimes I)(I \otimes \sigma_j)$ or equivalently, $\gamma_r = I$, $\gamma_\mu$, $\gamma_\mu \gamma_\nu$ ($\mu < \nu$), $\gamma_5 \gamma_\mu$, $\gamma_5 = \gamma_0 \gamma_1 \gamma_2 \gamma_3$ for $\mu = 0, 1, 2, 3$. Here $$\gamma_i = \begin{pmatrix} 0 & \sigma_i \\ \sigma_i & 0 \end{pmatrix} (i = 1, 2, 3) \text{ and } \gamma_0 = i\begin{pmatrix} I & 0 \\ 0 & -I \end{pmatrix}.$$

After some mathematical manipulations, we expand the QEM recovery operator as (Appendix C)

$$R_{QEM}(t) = \frac{C+E}{2}I + D(I \otimes \sigma_1) + \frac{F+2B-D}{2}(\sigma_1 \otimes I) - \tag{38}$$
$$\frac{E-C}{2}(\sigma_3 \otimes I) + B(\sigma_1 \otimes I)(I \otimes \sigma_1) - \frac{F-D}{2}(\alpha_3 \otimes \sigma_1).$$

From Eq. (26), we obtain the QEM cost function as $$c(t) = \frac{|C+E|}{2} + \frac{|C-E|}{2} + 2|B| + |D| + |F-D| \tag{39}$$
$$= \frac{|2 - 8.25\alpha + 8.3125\alpha^2 - 0.75\alpha^3|}{2|1 - 5.5\alpha + 8.3125\alpha^2 - 1.5\alpha^3 - 2.8125\alpha^4|} + \frac{|1.25\alpha - 2.6875\alpha^2 + 0.75\alpha^3|}{2|1 - 5.5\alpha + 8.3125\alpha^2 - 1.5\alpha^3 - 2.8125\alpha^4|} +$$

$$2\frac{|-0.5\alpha + 2.125\alpha^2 - 1.875\alpha^3|}{|1 - 5.5\alpha + 8.3125\alpha^2 - 1.5\alpha^3 - 2.8125\alpha^4|} +$$

$$\frac{|-\alpha + 2\alpha^2 - 0.9375\alpha^3|}{|1 - 5.5\alpha + 8.3125\alpha^2 - 1.5\alpha^3 - 2.8125\alpha^4|} + \frac{|0.5\alpha + 0.5\alpha^2 - 2.0625\alpha^3|}{|1 - 5.5\alpha + 8.3125\alpha^2 - 1.5\alpha^3 - 2.8125\alpha^4|}, \alpha = Re\,k(t).$$

FIG. 6 presents a graphical representation of the QEM cost function with respect to the normalized gate operation time $$\frac{t}{\tau_s}$$

for varying coupling strengths $\Gamma_0 \omega_c \tau_s$ between a quantum system and its environment. The environment is modeled using a set of simple harmonic oscillators, which serve as a fundamental approximation for the intricate interactions occurring between the quantum system and its surroundings. The QEM cost function is a quantitative measure of the deviation or error between the expected output and the actual outcome of a quantum computation. It helps assess the effectiveness of error reduction techniques applied to a quantum computing system. The normalized gate operation time $$\frac{t}{\tau_s}$$

is a dimensionless parameter that compares the actual gate operation time (t) to a characteristic time scale ($\tau_s$) of the system. This normalization enables the comparison of QEM strategies across various systems and gate operation times. In FIG. 6, the coupling strength signifies the intensity of interaction between the quantum system and the environment. A higher coupling strength corresponds to a stronger connection, which can result in a greater susceptibility to non-Markovian noise and other environmental influences. The simple harmonic oscillators offer a convenient method to model these interactions and their impact on the quantum system's behavior. The plot in FIG. 6 reveals that the cost function increases as the coupling strength becomes larger. This observation indicates that quantum systems with more substantial interactions with their environment are more prone to errors and necessitate more effective and efficient error mitigation strategies to ensure reliable performance. In conclusion, FIG. 6 highlights the importance of accounting for the coupling strength between the quantum system and its environment when developing and evaluating QEM techniques. By comprehending how the intensity of these interactions influences the cost function and the effectiveness of error mitigation strategies, researchers can design customized approaches to improve the performance and reliability of quantum computing systems amidst various environmental disturbances.

Discussion

In the present invention, we aim to quantify the errors in individual logical gates due to non-Markovian noise in quantum circuits, as well as determine the cost function for QEM. The results of our investigation demonstrate a strong correlation between the theoretical predictions and the experimental data obtained from an ion-trap based NISQ device. We discovered that the non-Markovian approach provides a reasonable description of the fluctuations in the output quantum states for both identity and CNOT gate operations. These findings suggest that the non-Markovian approach serves as a valuable tool for analyzing the impact of errors and decoherence on the output quantum states of NISQ devices. As the coupling strength increases, the cost function for QEM also rises.

The ideal operation of a circuit can be represented as a sequence of ideal logic gates $\{\hat{U}_n\}$, with an expected outcome of $$\ll \hat{O}\big|\rho_{out} \gg \; = \; \ll \hat{O}\Big|\prod_{m=1}^{n} \hat{U}_m^n |\rho_{in} \gg \{\hat{U}_n\}.$$

While modeling noise in a quantum system can be difficult, an alternative approach using a correlated Pauli-Lindblad super-operator $$L(\rho) = \sum_k \lambda_k (P_k \rho P_k - \rho)$$

for a set of Pauli matrices $P_k$ has been proposed.

Our theoretical model for non-Markovian errors, based on the Caldeira-Leggett model, demonstrates a higher degree of agreement with the IonQ machine for the CNOT operation. This is likely due to the fluctuations of the qubit state in an ion trap, which can be better described by the Caldeira-Leggett interaction model.

In conclusion, this paper presents a non-Markovian approach to analyzing quantum state fluctuations in NISQ devices that interact with their environment, which is modeled by simple harmonic oscillators as a noise source. We also provide a quantitative model of a cost function for QEM. To achieve this, we employed a projection operator method and advanced and retarded propagators in time. The formalism can be applied to model any quantum system, given specific forms of the system, reservoir, and interaction Hamiltonians.

The authors derived an analytical form of the reduced-density-operator for the output quantum states in a time-convolutionless form and compared the results with experimental data from ion-trap and superconducting quantum computing systems. The results exhibit a strong agreement between the theory and experimental outcomes. The error model and the cost function, derived from the time-convolutionless equation and incorporating non-Markovian effects, can serve as foundational elements for QEM in noisy quantum circuits.

APPENDIX A: DERIVATION OF EQUATION (32)

From Equations (60) to (62) of the Supplementary Information and Equation (24) of the main text, we obtain $$Re\, k(t) = \frac{2}{\pi}\Gamma_0 \Big\{ \frac{\pi}{2}\omega_c t + \int_0^{t/\tau_s} Si(\omega_c \tau_s t) \Big\}, \tag{A1}$$

$$\text{where } Si(x) = \int_0^x \frac{\sin t}{t} dt$$

and for small x, $Si(x) \approx x$. Combining these results, we obtain Equation (32):

$$Re\, k(t) \approx \frac{2}{\pi}\Gamma_0 \omega_t \tau_s \Big\{ \frac{\pi}{2}\Big(\frac{t}{\tau_s}\Big) + \frac{1}{2}\Big(\frac{t}{\tau}\Big)^2 \Big\}. \tag{32}$$

APPENDIX B: DERIVATION OF EQUATION (31) AND (33)

From Equations (22) and (23), $$V_{11111}(t) = \delta_{11}\delta_{11} - 2\left[\delta_{11}\sum_{a'}M_{[a'a']} - M_{1111}\right]\text{Re}\,k(t), \qquad (B1)$$

$$\sum_{a'}M_{[a'a']} - M_{1111} = M_{1221} + M_{1331} + M_{1441},$$

where $$M_{1221} = \frac{1}{4}\langle 1|X_1|2\rangle\langle 2|X_1|1\rangle + \frac{1}{4}\langle 1|Y_1|2\rangle\langle 2|Y_1|1\rangle + \frac{1}{4}\langle 1|Z_1|2\rangle\langle 2|Z_1|1\rangle + \qquad (B2)$$

$$\frac{1}{4}\langle 1|X_2|2\rangle\langle 2|X_2|1\rangle + \frac{1}{4}\langle 1|Y_2|2\rangle\langle 2|Y_2|1\rangle + \frac{1}{4}\langle 1|Z_2|2\rangle\langle 2|Z_2|1\rangle.$$

Here $$\langle 1|X_1|2\rangle = \langle 00|X_1\frac{1}{\sqrt{2}}(|01\rangle + |01\rangle) = \frac{1}{\sqrt{2}}\langle 2|X_1|1\rangle,$$

$$\langle 1|Y_1|2\rangle = \langle 00|Y_1\frac{1}{\sqrt{2}}(|01\rangle + |10\rangle) = \frac{-i}{\sqrt{2}},$$

$$\langle 2|Y_1|1\rangle\frac{-i}{\sqrt{2}},$$

$$\langle 1|Z_1|2\rangle = \langle 2|X_1|1\rangle = 0.$$

$$\langle 1|X_2|2\rangle = \langle 00|X_2\frac{1}{\sqrt{2}}(|01\rangle + |10\rangle) = \frac{1}{\sqrt{2}}\langle 2|X_2|1\rangle, \qquad (B3)$$

$$\langle 1|Y_2|2\rangle = \langle 00|Y_2\frac{1}{\sqrt{2}}(|01\rangle + |10\rangle) = \frac{-i}{\sqrt{2}},$$

$$\langle 2|Y_2|1\rangle = \frac{-i}{\sqrt{2}},$$

$$\langle 1|Z_2|2\rangle = \langle 2|X_2|1\rangle = 0.$$

and as a result, we have $$M_{1221} = \frac{1}{4}\frac{1}{2} + \frac{1}{4}\frac{1}{2} + \frac{1}{4}\frac{1}{2} + \frac{1}{4}\frac{1}{2} = \frac{1}{2}.$$

Likewise, we obtain $$M_{1331} = 0, \; M_{1441} = \frac{1}{2} \text{ and } V_{11111}(t) = 1 - 2\text{Re}k(t). \qquad (B4)$$

Since $M_{1331} = M_{3113} = 0$, we also have $$\rho_{33}(t) = V_{33111}\rho_{11}(0) = 2M_{3113}\text{Re}k(t)\rho_{11}(0) = 0. \qquad (B5)$$

From $$\text{Re}k(t) \approx \frac{2}{\pi}\Gamma_0\omega_0\tau_s\left\{\frac{\pi}{2}\left(\frac{t}{\tau_s}\right) + \frac{1}{2}\left(\frac{t}{\tau}\right)^2\right\}.$$

we have $$1 - 2\text{Re}k(t) \approx 1 - \frac{4}{\pi}\Gamma_0\omega_0\tau_s\left\{\frac{\pi}{2}\left(\frac{t}{\tau_s}\right) + \frac{1}{2}\left(\frac{t}{\tau}\right)^2\right\} = \qquad (33)$$

-continued $$1 + \frac{\pi}{2}\Gamma_0\omega_0\tau_s - \frac{2}{\pi}\Gamma_0\omega_0\tau_s\left(\frac{\pi}{2} + \frac{t}{\tau_s}\right)^2 \approx$$

$$\exp\left(\frac{\pi}{2}\Gamma_0\omega_0\tau_s\right)\exp\left(-\frac{2}{\pi}\Gamma_0\omega_0\tau_s\left(\frac{\pi}{2} + \frac{t}{\tau_s}\right)^2\right),$$

which proves Equation (33) for sufficiently small $\Gamma_0\omega_c\tau_s$.

APPENDIX C: DERIVATION OF EQUATIONS (37) TO (39)

Ideal evolution operator corresponding to the CNOT gate with respect to the bases given by Equation (34) is given by $$\varepsilon_{CNOT} = \begin{pmatrix} 1 & 0 & 0 & 0 \\ 0 & 1 & 0 & 0 \\ 0 & 0 & 1 & 0 \\ 0 & 0 & 0 & -1 \end{pmatrix}, \qquad (C1)$$

and from Equation (25), $\varepsilon_{CNOT} = R_{QEM}(t)\,V(t)$. Therefore, $R_{QEM}(t) = \varepsilon_{CNOT}V^{-1}(t)$ which is described by Equation (37). The quantum error mitigation matrix $R_{QEM}$ is 4×4 matrix and can be expanded by 16 Dirac matrices such as $$\sigma_1 \otimes I = \begin{pmatrix} 0 & 0 & 1 & 0 \\ 0 & 0 & 0 & 1 \\ 1 & 0 & 0 & 0 \\ 0 & 1 & 0 & 0 \end{pmatrix}, \quad I \otimes \sigma_1 = \begin{pmatrix} 0 & 1 & 0 & 0 \\ 1 & 0 & 0 & 0 \\ 0 & 0 & 0 & 1 \\ 0 & 0 & 1 & 0 \end{pmatrix}, \qquad (C2)$$

$$\sigma_3 \otimes \sigma_1 = \begin{pmatrix} 0 & 1 & 0 & 0 \\ 1 & 0 & 0 & 0 \\ 0 & 0 & 0 & -1 \\ 0 & 0 & -1 & 0 \end{pmatrix}.$$

If we expand $R_{QEM}$ with these Dirac matrices, we obtain Equation (38) and using Equation (26), we get Equation (39).

APPENDIX D: DERIVATION OF EQUATION (19)

Here we follow Loss and DiVincenzo to show the derivation of Equation (19).

We first define the bosonic operator for the heat bath as follows:

$$b_i^j = \sum_a g_a^{ij}\left(a_{a,ij} + a_{a,ij}^\dagger\right), \qquad (D1)$$

$$b_i^j(t) = \sum_a g_a^{ij}\left(a_{a,ij}(t) + a_{a,ij}^\dagger(t)\right)$$

$$= \sum_a g_a^{ij}\left(a_{a,ij}\exp\left[-i\omega_a^{ij}t\right] + a_{a,ij}^\dagger\exp\left[i\omega_a^{ij}t\right]\right).$$

Where $b_i^j$ is the fluctuating bosonic quantum field, $$\left(a_{a,ij}\left(a_{a,ij}^\dagger\right)\right)$$

are annihilation (creation) operator with j=X, Y, Z, and $\omega_\alpha^{ij}$ are the corresponding frequencies.

Then $$Tr_B\left[b_i^j(t)b_k^l\rho_B\right] = \sum_{\alpha,\beta} g_\alpha^{ij}g_\beta^{kl}Tr_B\left[\left(a_{\alpha,ij}\exp(-i\omega_\alpha^{ij}t) + a_{\alpha,ij}^\dagger\exp(i\omega_\alpha^{ij}t)\right)\left(a_{\beta,kl}\exp(-i\omega_\beta^{kl}t) + a_{\beta,kl}^\dagger\exp(i\omega_\beta^{kl}t)\right)\rho_B\right] \quad (D2)$$

$$= \sum_\alpha \left(g_\alpha^{ij}\right)^2 \delta_{i,k}\delta_{j,l}Tr_B\left[a_{\alpha,ij}a_{\alpha,kl}^\dagger\rho_B\right]\exp(-i\omega_\alpha^{ij}t) + \sum_\alpha \left(g_\alpha^{ij}\right)^2 \delta_{i,k}\delta_{j,l}Tr_B\left[a_{\alpha,ij}^\dagger a_{\alpha,kl}\rho_B\right]\exp(i\omega_\alpha^{ij}t)$$

$$= \sum_\alpha \left(g_\alpha^{ij}\right)^2 \delta_{i,k}\delta_{j,l}\left[2n(\omega_\alpha^{ij})\cos(\omega_\alpha^{ij}t) + \exp(-i\omega_\alpha^{ij}t)\right].$$

Where $$Tr_B\left(a_\alpha^\dagger a_\alpha\rho_B\right) = n(\omega_\alpha), \quad (D3)$$

$$Tr_B\left(a_\alpha a_\alpha^\dagger\rho_B\right) = n(\omega_\alpha) + 1.$$

By taking the limit $g_\alpha^{ij}\to g_\alpha$, $\omega_\alpha^{ij}\to\omega_\alpha$, we obtain the expression for Equation (19).

APPENDIX E: OFF-DIAGONAL ELEMENT

For example, $$\rho_{12}(t) = \sum_{\gamma,\delta} V_{|2|\gamma\delta}(t)\rho_{\gamma\delta}(0) \quad (E1)$$

$$= V_{12111}(t)\rho_{11}(0)$$

$$= [M_{1112}k(t) - (M_{1222} + M_{1332} + M_{1442})k^*(t)]\rho_{11}(0)$$

$$= 0.$$

$$\text{since } M_{1112} = 0, M_{1222} = 0, M_{1132} = \frac{1}{4}, M_{1442} = -\frac{1}{4}.$$

It will be apparent to those skilled in the art that various modifications and variation may be made in the present invention without departing from the spirit or scope of the invention. Thus, it is intended that the present invention cover the modifications and variations of this invention provided they come within the scope of the appended claims and their equivalents.

What is claimed is:

1. A method performed by a quantum computing system comprising a quantum processor having a plurality of qubits, for recovering quantum error induced by non-Markovian noise, the method comprising:

obtaining, by the quantum processor, a transfer function matrix including non-Markovian noise;

obtaining, by the quantum processor, an ideal operator for a requested gate operator;

generating, by the quantum processor, a recovery matrix by multiplying the ideal operator by an inverse matrix of a transfer function matrix including non-Markovian noise;

applying, by the quantum processor, the recovery matrix to the requested gate operator; and evaluating, by the quantum processor, a quantum error mitigation (QEM) cost function based on measured probabilities of output quantum states to suppress residual non-Markovian noise, wherein the transfer function matrix is computed using a time-convolutionless reduced-density operator formalism executed by the quantum processor under a Hubbard Hamiltonian framework.

2. The method of claim 1, wherein obtaining the transfer function matrix including non-Markovian noise, is performed by the quantum processor using equations of motion for a total density operator obtained through a quantum Liouville equation Hamiltonian given by $$\frac{d}{dt}\rho_T(t) = -i\left[\hat{H}_T(t), \rho_T(t)\right] = -i\hat{L}_T(t)\rho_T(t),$$

wherein

"i" is an imaginary unit,

"$\hat{H}_T(t)$" is a reduced Planck constant, and

"$\rho_T(t)$" is a total density operator of the system plus environment.

3. The method of claim 2, wherein the quantum processor models a two-state Hamiltonian as Hamiltonian expressed as a stochastic Hamiltonian to represent qubit-environment interactions.

4. The method of claim 2, wherein the quantum processor models a two-state Hamiltonian as Hubbard Hamiltonian a time-dependent Heisenberg couplings is applied for electron spin operators of the qubits.

5. The method of claim 4, wherein the quantum processor employs a Liouville super operator in one-to-one correspondence with the total Hamiltonian to derive the transfer function matrix.

6. The method of claim 5, wherein the transfer function matrix including non-Markovian noise is calculated by the quantum processor according to a time-convolutionless reduced-density operator formalism $$\rho(t) = \hat{V}^{(2)}(t)p(0) + \int_0^t ds \int_0^s d\tau\, tr_B\left[\hat{H}_{int}\rho_B\rho(-s)\hat{H}_{int}(\tau - s)\right] -$$

$$\int_0^t ds \int_0^s d\tau\, tr_B\left[\rho_B\rho(-s)\hat{H}_{int}(\tau - s)\hat{H}_{int}\right].$$

7. The method of claim 4, wherein the transfer function matrix is formed by one of a single qubit gate, a two qubits gate, a tensor product thereof or a tensor sums thereof.

* * * * *